(12) United States Patent
Kvietok et al.

(10) Patent No.: US 6,986,806 B2
(45) Date of Patent: Jan. 17, 2006

(54) AIR FILTERING DEVICE

(75) Inventors: Frank Andrej Kvietok, Cincinnati, OH (US); Zaiyou Liu, West Chester, OH (US); Steven I. Paljieg, Mason, OH (US); Sonia Redmon, Cincinnati, OH (US); Alessandro L. Spadini, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 10/682,329

(22) Filed: Oct. 9, 2003

(65) Prior Publication Data
US 2004/0129143 A1 Jul. 8, 2004

Related U.S. Application Data

(63) Continuation of application No. 10/211,092, filed on Aug. 2, 2002, now abandoned, which is a continuation of application No. PCT/US00/13531, filed on May 18, 2000.

(51) Int. Cl.
*B01D 53/02* (2006.01)

(52) U.S. Cl. .............................. 96/132; 96/135; 96/148; 96/153; 422/169

(58) Field of Classification Search ................. 96/121, 96/131, 132, 134, 135, 147, 148, 153, 154; 55/385.4, 467, 471, 486, 514, 524, DIG. 13; 62/78; 95/144; 422/169, 170, 171; 423/210, 423/245.1
See application file for complete search history.

(56) References Cited

U.S. PATENT DOCUMENTS

| | | | |
|---|---|---|---|
| 3,049,399 A | * | 8/1962 | Kuehner et al. ............... 422/4 |
| 3,887,948 A | | 6/1975 | Stamper |
| 3,972,678 A | | 8/1976 | Nakshbendi |
| 4,235,750 A | | 11/1980 | Cazalet |
| 4,604,110 A | | 8/1986 | Frazier |
| 4,948,567 A | | 8/1990 | Atarashiya |
| 4,963,166 A | | 10/1990 | Hoyt et al. |
| 5,212,131 A | * | 5/1993 | Belding ...................... 502/60 |
| 5,288,306 A | | 2/1994 | Aibe et al. |
| 5,403,548 A | | 4/1995 | Aibe et al. |
| 5,451,248 A | * | 9/1995 | Sadkowski et al. ............ 95/99 |
| 5,616,169 A | | 4/1997 | de Ruiter et al. |
| 5,624,478 A | | 4/1997 | Patapanian et al. |
| 5,772,738 A | | 6/1998 | Muraoka |
| 5,858,045 A | | 1/1999 | Stemmer et al. |
| 5,871,569 A | * | 2/1999 | Oehler et al. ................. 96/153 |
| 6,156,089 A | * | 12/2000 | Stemmer et al. .............. 55/467 |

FOREIGN PATENT DOCUMENTS

| | | |
|---|---|---|
| DE | 3002409 | 7/1981 |
| DE | 3640953 | 6/1988 |
| EP | 0311454 | 4/1989 |
| FR | 2189076 | 3/1974 |
| JP | 3251253 | 11/1991 |
| JP | 05-203336 | 8/1993 |
| JP | 06288572 | 10/1994 |
| JP | 10-238934 | 9/1998 |
| JP | 11047256 | 2/1999 |

\* cited by examiner

*Primary Examiner*—Frank M. Lawrence
(74) *Attorney, Agent, or Firm*—Thibault Fayette; Kim William Zerby; Steven W. Miller

(57) ABSTRACT

The present invention relates to air filtering devices for removing malodor and ethylene from the air. Such devices are useful for example for storing and preserving fluid in closed compartments such as refrigerators. The air filtering device of the present invention is characterized in that a first filtering member is capable of removing malodors from the air and a second filtering members capable of removing ethylene from the air.

21 Claims, 3 Drawing Sheets

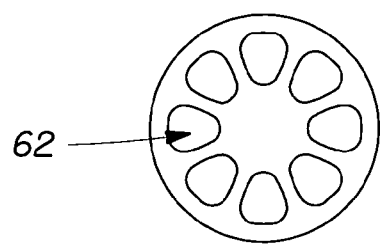
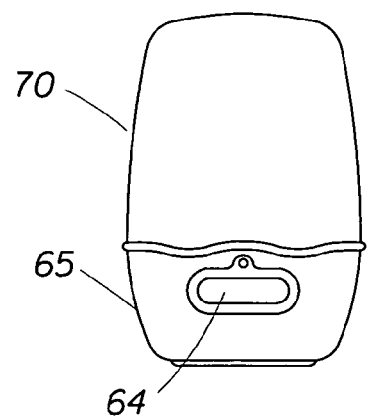
Fig. 4B
Fig. 4A
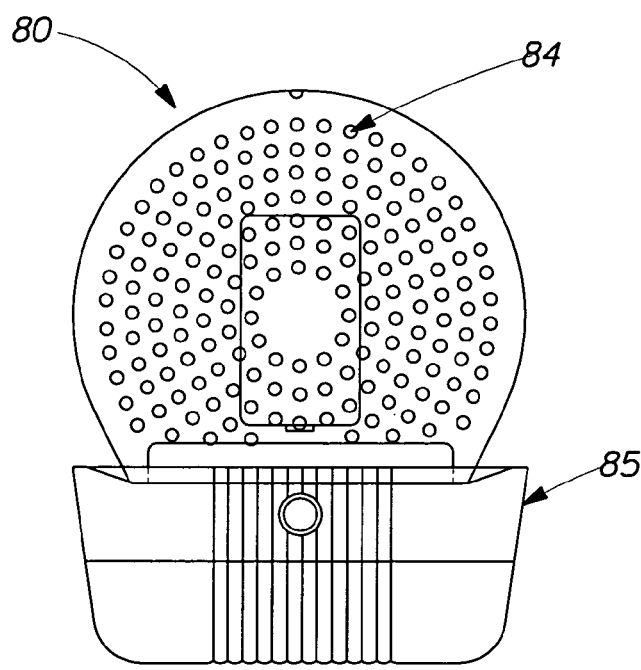
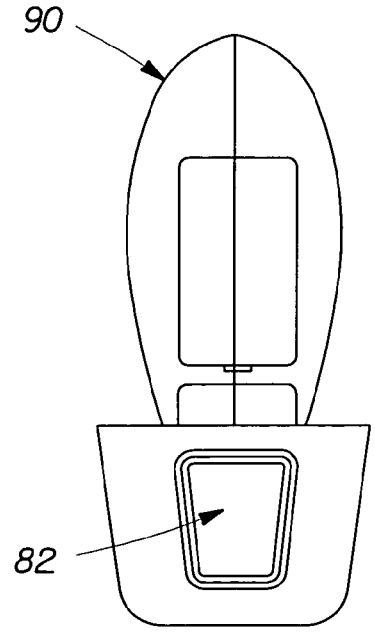
Fig. 5A
Fig. 5B

AIR FILTERING DEVICE

CROSS REFERENCE TO RELATED APPLICATIONS

This is a continuation of U.S. application Ser. No. 10/211,092 filed Aug. 2, 2002, now abandoned, which is a continuation of International Application PCT/US00/13531 with an international filing date of May 18, 2000.

FIELD OF THE INVENTION

The present invention relates to air filtering devices for removing malodor and ethylene from the air. Such devices are useful for example for storing and preserving food in closed compartments such as refrigerators.

BACKGROUND

Nowadays, refrigerators have become a common appliance in virtually every household and typically are used for storage and preservation of food in particular of fresh food such as fruits, vegetables, dairy products, and the like. It is desirable to keep the food items fresh as long as possible in the refrigerator.

It is a well known problem that many food items tend to release malodors into the air which are then captured in the limited air space in a refrigerator. Not only are these malodors unpleasant and offensive to the user of the refrigerator, they can also have a negative impact on the quality of other foods in the refrigerator. For example, it is known that some foods emit strong odors (e.g. fish, boiled eggs, onions, etc.) and that these odors can transfer to other nearby foods and hurt the taste and freshness of those foods. A common example is transfer of odors into an open container of orange juice or of milk resulting in a noticeable degradation in their taste. It is also well known that malodors from some vegetables (onions, garlic) can transfer to other foods stored within a vegetable drawer. This problem is aggravated when the vegetable drawer is sealed such that there is very little air exchange with the larger compartment of the refrigerator (herein referred to as the "fresh food compartment") and when vegetables have been cut or are stored without any outer wrapping. This problem of odor transfer is particularly acute in the case of ice cubes where odors from the fresh food compartment of the refrigerator can be transferred to the ice in the freezer compartment of the refrigerator. This is especially true in the case of refrigerators in which there is air exchange between the fresh food and freezer compartments, and especially in the case of refrigerators with built-in ice-makers.

In addition to malodors, however, fruits and vegetables are known to produce ethylene as a part of their normal ripening process. Unfortunately this ethylene also contributes to the degradation of ethylene sensitive foods, primarily vegetables like broccoli, lettuce, green peppers, etc. Ethylene-producing and ethylene-sensitive fruits and vegetables are well known.

U.S. Pat. No. 5,403,548 discloses an activated carbon absorbent to be used for example in refrigerators, shoe boxes, closets, toilets, cars, cupboard, or the like. The activated carbon absorbent is applied in a gas treating apparatus comprising an air inlet, and air outlet, a cylinder housing the activated carbon honeycomb, and a fan aspiring malodor through the air inlet. Change of battery and withdrawal of the cylinder housing the activated carbon are achieved by dismounting the cover of the apparatus. The gas treating apparatus may further comprise an action means for alerting the user to the event that the useful life of the activated carbon adsorbent has run out. This gas treating apparatus has the disadvantage that it is not capable of removing ethylene from the air.

It is therefore an object of the present invention to provide an air filtering device which overcomes the disadvantages of the prior art devices.

It is a further object of the present invention to provide an air filtering device which is capable of removing both malodors and ethylene from the air.

SUMMARY OF THE INVENTION

The present invention provides an air filtering device comprising a first filtering member, a second filtering member, and an air flow conduit defining an air flow path through the device from an air inlet to an air outlet. The first filtering member and the second filtering member are positioned to interact with at least a portion of the molecules flowing along the air flow path or being adsorbed in one of the filter members. The air filtering device of the present invention is characterized in that the first filtering member is capable of removing malodors from the air and the second filtering members capable of oxidizing ethylene.

BRIEF DESCRIPTION OF THE FIGURES

FIG. 4A is a front elevational view of an alternate example of the device of the present invention;

FIG. 4B is a top view of the device of FIG. 4A;

FIG. 5A is a front elevational view of another example of a device of the present invention;

FIG. 5B is a side elevational view of the device of FIG. 5A.

DETAILED DESCRIPTION OF THE INVENTION

Figure 1:
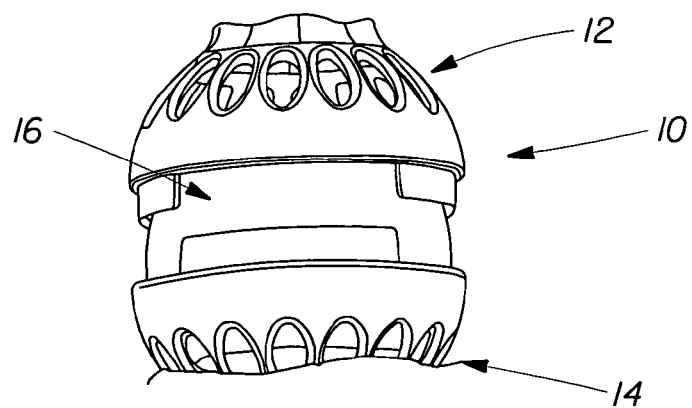
FIG. 1 is a perspective view showing one example of a filter member according to the present invention.

The device of the present invention is intended to filter air in confined spaces such as for example in refrigerators, food storage closets, pantries, coolers, and the like. The simultaneous removal of malodors and ethylene has been found to be particularly beneficial for keeping food items such as fruits and vegetables fresh for an extended period of time. In addition, transfer of malodors or taste from one food item to another one is prohibited.

Filtering of the air to remove malodors in the device the present invention may be achieved by adsorbing the molecules constituting a malodor onto a surface of a filter member. The term "adsorption" is well defined in the art and refers to the adherence of molecules to surfaces which effectively reduces the mobility of these molecules to the two dimensions of the surface. Those molecules remaining in the air will then diffuse so that further molecules come into contact with the surface and subsequently will be adsorbed. Consequently, most of the malodor molecules will travel into the proximity of one of the surfaces at some point in time so that finally most of the malodor will be removed from the air.

A suitable filter member for removing malodors comprises activated carbon for the adsorption. Activated carbon is known to be a very effective filter medium due to its high specific surface area. Whilst activated carbon is very effective as such, the filter member of the present invention may further comprise agents supported on the activated carbon to specifically attack certain malodors such as those comprising S atoms or N atoms. Preferably, the filter members of the present invention comprise at least 2 grams, more preferably at least 5 grams, and most preferably at least 10 grams of activated carbon. Preferably, the filter members of the present invention comprise less than 100 grams, more preferably less than 50 grams, yet more preferably less than 40 grams, and most preferably less than 30 grams of activated carbon.

A wide variety of activated carbon based filter media is known in the art. The carbon for the media could come from any source. Coconut shells are a common example of a source of activated carbon.

The filter member of the present invention may comprise a support for the activated carbon for example in the form of a foam, a nonwoven web or a woven web, or an open-pore or reticulate structure, such as a foam or a mesh.

Although activated carbon is used in many odor control applications in the form of granules and pellets, these forms have disadvantages for the present invention. First, these particle forms, because of their low ratio of surface area to mass, do not facilitate rapid adsorption of odors from a confined space. Second they introduce a high pressure drop which further impedes adsorption and their effectiveness at removing odors. In conjunction with an air moving means, the pressure drops across these beds of granules or pellets require a relatively high operating power to achieve the air flow rates needed to get fast and effective odor removal. This is a critical disadvantage for a product designed for use in confined spaces, as the addition of more and more power leads to bigger, more costly, and noisier devices for these applications.

While the adsorption rates can be increased by using powder forms of activated carbon with much smaller particle sizes than granular activated carbon, the powder forms are difficult to handle and further increase the pressure drop issue described above.

It has been found that this pressure drop problem can be overcome through the use of an activated carbon filter member wherein the activated carbon is supported on an support structure, such as open-pore reticulate structure, a foam or mesh which provides flow-through channels for air contacting with activated carbon particles supported on and within the support structure.

The use of such supported forms of activated carbon allows one to obtain high thermodynamic capacity for adsorbing odors while at the same time enabling rapid adsorption due to the low pressure drop and high degree of contacting between the individual activated carbon particles and the air. In combination with an air moving means, this preferred filter structure allows very rapid removal of odors in confined spaces even with a device having a relative small power supply such as a single battery and having a relatively small size compared to the spaces in which it is used.

Suitable forms of supported activated carbon structures preferably have an overall member density of between 0.01 to 0.40 g/cc, more preferably between 0.05 to 0.35 g/cc, even more preferably between 0.10 to 0.30 g/cc, and most preferably between 0.15 and 0.25 g/cc.

Satisfactory performance is achieved when the activated carbon particles in the structure have a specific surface area of about 600 to 2000 m2/g and when the activated carbon density within the filter member is between 0.01 to 0.32 g/cc, more preferably between 0.02 to 0.30 g/cc, even more preferably between 0.08 to 0.25 g/cc, and most preferably between 0.10 to 0.20 g/cc.

Suitable forms of supported activated carbon are the reticulated polyurethane foam products which are commercially available from Helsa-Werke, Helmut Sandler CmbH & Co KG, Germany, under the designations Helsa-tech 8126, 8139, 5600, and 5615.

Removing of ethylene from the air in the device the present invention is achieved by means of an oxidation agent such as potassium permanganate in a solid form. The oxidation agent may be supported on a solid particle such as a zeolite or alumina. The oxidation agent or the solid particle material supporting the oxidation agent may then be supported on a foam or layered in or between nonwoven web materials, woven web materials, or the like. When ethylene comes into contact with oxidation agent, it is oxidized to carbon dioxide and water. Preferably, the filter member of the device of the present invention contains potassium permanganate on alumina and contains at least 0.01 grams of potassium permanganate. Of course, the amount of potassium permanganate needed to achieve optimum performance depends on the circumstances of the specific use and hence may have to and can be adopted by the skilled person.

A suitable oxidation agent member for the present invention comprising potassium permanganate is commercially available from Purafil Inc. of Doravill, Ga., USA, under the designation "Purafil P800".

The filter member of the present invention comprises an air inlet, and air outlet, and air flow path through the filter member from the air inlet to the air outlet. The filter medium is disposed in the filter member of the present invention such that it comes into contact with the air flowing along the air flow path. The filter medium may be arranged as a flow by filter or as a flow through filter.

Suitable filter members for the method of the present invention include passive filter members and forced air filter members. The term "passive filter member" as used herein refers to those filter members which only rely on air convection and on diffusion to bring malodors within reach of the filter media in the member. The term "forced air filter member" as used herein refers to those filter members which can be attached to a forced air moving member which draws air into the device through a filter member containing a filter media and increases air flow through the filter media above that achieved through normal air convection in the confined space. As used within this disclosure, a forced air filter member consists of a filter member and an air moving member. A filter member suitable for the forced air filter members may be a passive filter member according to the above definition.

The deodorization of the air and the removal of ethylene in the device of the present invention is enhanced by increasing the air flow through the filter member by means of an air moving member. Preferably, the air moving means moves at least 10 ml of air per second through the air inlet into the device, more preferably at least 100 ml/s, most preferably at least 300 ml/s.

Of course, the optimum rate of air flow strongly depends on the particular circumstances of the specific use. Hence, it may necessary for the skilled person to adjust the air flow rate accordingly. There are known in the art a wide variety of suitable air moving members such as for example fans and blowers. A particularly suitable fan is a centrifugal fan. A suitable member for driving the fan is a small motor, for example a DC motor available from MABUCHI MOTOR CO., LTD., Japan, under the designation of RF-330TK. The air moving members of the present invention may be powered electrically. Many electrical power sources could be imagined including domestic AC electrical power or power from a static power supply. Alternatively and preferably electrical power may be supplied by means of a battery, preferably a dry alkaline cell battery, or a rechargeable battery. Any replaceable power supply preferably is designed to last at least one month, more preferably at least two months, yet more preferably at least three months, most preferably at least four months.

The device of the present invention may comprise a switch member periodically switching the air moving member on and off to conserve energy. The switch member may coupled to a sensor member which detects the need to operate the air moving member such as by determining the odor or ethylene concentration.

Preferably, the filter medium is constructed such that surface area of potassium permanganate which is immediately exposed to the air in the filter medium is minimized. The term "immediately exposed to air" as used herein refers to configurations in which the surface of the potassium permanganate is not in contact with other surfaces such as activated carbon, carrier structures, the housing of the filter, and the like. Preferably less than 30% of the macroscopic surface area of the potassium permanganate, more preferably less than 20% of the macroscopic surface area of the potassium permanganate, most preferably less than 10% of the macroscopic surface area of the potassium permanganate are immediately exposed to air.

The term "macroscopic surface area" as used herein refers to the surface area of the potassium permanganate which is accessible to a probe having a square head of 1 $cm^2$ surface area, i.e. by disregarding corrugations having an extension of less than 1 cm. Consequently, the macroscopic surface area of potassium supported on a web material would for example be the surface area of the two major surfaces of the web material.

To further reduce immediate air contact, it is preferred that the air flow is directed to flow by the potassium permanganate. If the potassium permanganate is arranged in an essentially two dimensional configuration such as on a web material, the air flow should be directed to not flow through the web.

Preferably, the potassium permanganate on its carrier is arranged such that it is in contact with the surface of the activated carbon such that ethylene molecules adsorbed on the carbon surface may migrate to the permanganate and ultimately be oxidized by the permanganate. Preferably at least 30% of the macroscopic surface area of the potassium permanganate, more preferably at least 40% of the macroscopic surface area of the potassium permanganate, and most preferably at least 50% of the macroscopic surface area of the potassium permanganate are in contact with activated carbon.

Without wishing to be bound by this theory, it is believed that by minimizing immediate exposure of the permanganate to air and by bringing the permanganate into contact with the activated carbon, a surprising increase in ethylene removal performance is achieved. The permanganate by itself appears to be much less effective in removing much ethylene at all in passive mode. The oxidative reaction must be catalyzed by activated carbon in order to occur. Exposing as much activated carbon surface as possible to the air not only optimizes malodor control, but it accelerates ethylene removal by more rapidly creating a high ethylene concentration region around the permanganate fabric. Since activated carbon cannot 'hold' ethylene very effectively within its matrix, it releases it slowly creating ideal conditions for the permanganate fabric (which is very poor kinetically by itself) to destroy it. Hence, placing the two elements as close to one another as possible is best for ethylene removal. One can imagine that in a situation in which ethylene is adsorbing and de-adsorbing within the activated carbon matrix all the time, the oxidation of ethylene at the fringes of the activated carbon foam creates an ethylene concentration gradient. This creates a radial driving force that evacuates the activated carbon of ethylene.

In one suitable embodiment, the filter medium is constructed such that the ethylene-removing material mentioned previously is wrapped radially around a cylindrical or semispherical foam/carbon filter. In this configuration, the permanganate fabric is not immediately exposed to the air, and the permanganate is in contact with activated carbon on one side and the filter enclosure on the other. In addition, this orientation is ideal for minimizing processing cost: The permanganate need not be embedded into the activated carbon and very little work has to be done to contain it within the filter. No aesthetic aides are needed as the permanganate is hidden from the filter inlet and outlet. No fabric is wasted in processing as it is cut into rectangular strips rather than more complicated shapes such as disks. The lowest pressure drop possible is achieved (active mode) as only one of the filtering elements is exposed to direct airflow; this minimizes power draw and maximizes battery life. The best malodor control is achieved as the largest possible surface area of activated carbon is exposed to the air.

Surprisingly, it has been found that this configuration maximizes ethylene removal rates and ethylene removal capacity in both active and passive mode. In active mode, the filter is superior to conventional ethylene removal devices in terms of ethylene removal rates while still being constructed without the use of more complicated technologies such as spray coating or embedding. Additionally, this configuration seems to minimize oxidation of other species thereby maximizing the oxidative capacity of permanganate and preventing the creation of unfavorable intermediates such as acetaldehyde, frequently mentioned in literature as a drawback of permanganate oxidation systems.

FIG. 1 is a perspective view showing one example of a filter member (10). The filter member (10) of the present invention comprises an air inlet (12), an air outlet (14), and an air flow path through a filter medium (16) from the air inlet (12) to the air outlet (14). The filter medium (16) is disposed in the filter member (10) of the present invention such that it comes into contact with the air flowing along the air flow path. Preferably, the filter medium (16) contains a carbon filter that is in the general shape of a cylinder, more preferably in the shape of several disks of various diameters and thicknesses such that when the disks are placed atop one another they approach the shape of a sphere or a portion thereof.

Figure 2:
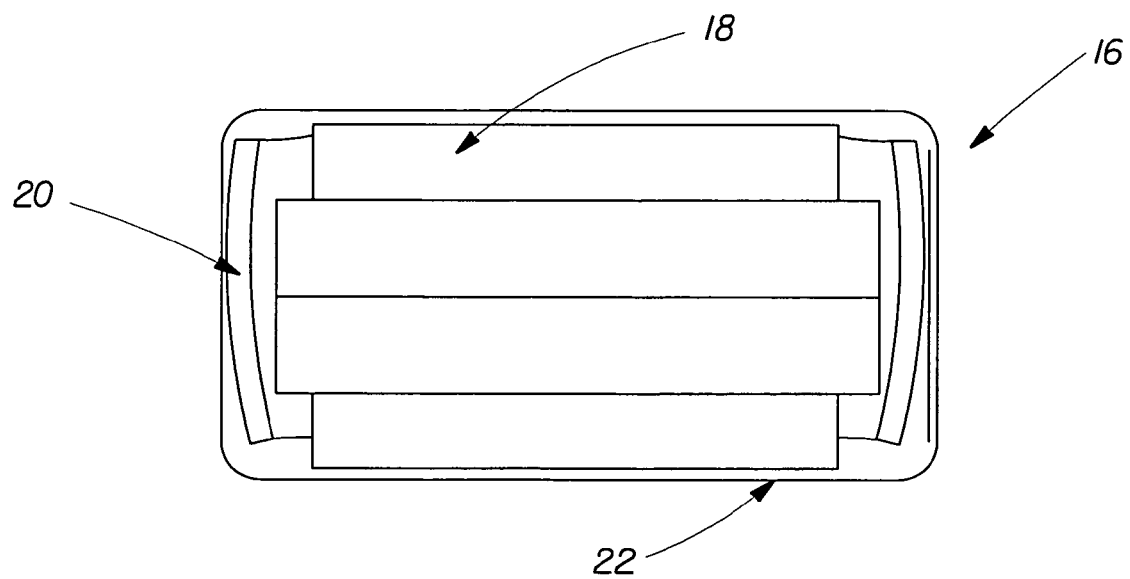
FIG. 2 is a cross-section of a filter medium for the filter member shown in the example of FIG. 1.

FIG. 2 is a cross-section of the filter medium (16) shown in the example of FIG. 1. The filter medium (16) consists of several disks of activated carbon supported by a foam (18), such as a polyurethane foam. The disks are placed atop one another. Around this stack is wrapped a piece of nonwoven material (20) supporting potassium permanganate on alumina. To prevent spillage of carbon particles, this entire assembly is contained in a piece of woven nylon (22) which is stretched tight. The nylon is stretched to a point such that the average pore size of the nylon is less than 0.5 $mm^2$.

Figure 3:
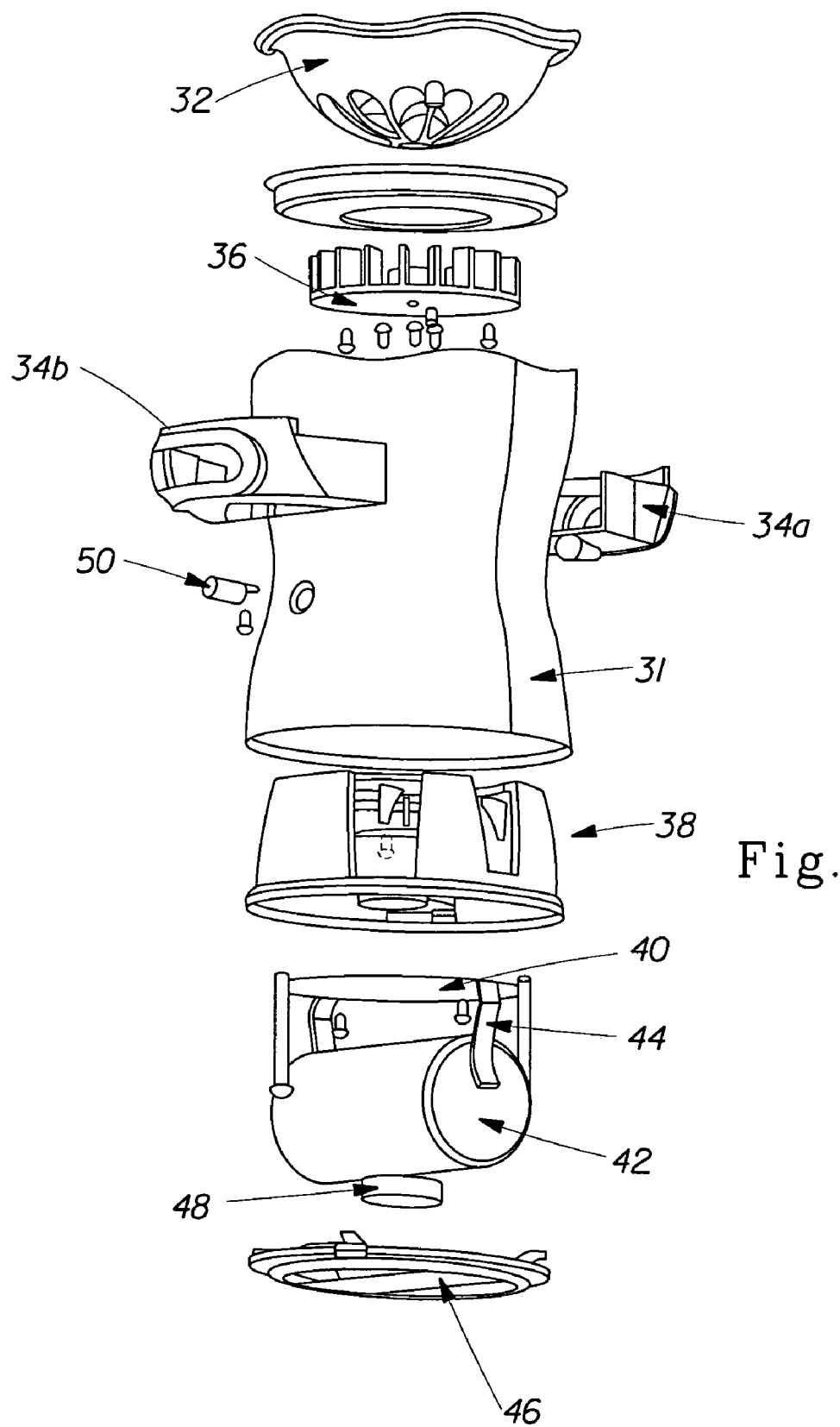
FIG. 3 is a partial exploded view of an example of a device of the current invention.

FIG. 3 is a partial exploded view of an example of a device (30) of the current invention. The device comprises a main housing (31) into which two air outlet fixtures (34a, 34b) are installed. The main housing (31) is sized to contain all of the elements described below. In the preferred mode of this examples the filter member (10) of FIG. 1 is placed on top of the air inlet (32) such that air is drawn through the filter member (10) via a suction force produced by an air moving member, such as a fan. A particularly suitable fan to deliver this suction force is a centrifugal fan (36). The centrifugal fan (36) is contained in a small chamber which helps to maximize the air flow, allowing air to be drawn in near the center of the impeller and expelled perpendicular to the entry direction and through the air outlet fixtures (34a, 34b) of the device (30). The air outlet fixtures (34a, 34b) are positioned in the main housing (31) such that the rotation of the fan is visible through outlets of the fixtures (34a, 34b). This allows a means of confirming the action of the fan. Preferably, the air moving member moves at least 100 ml of air per second through the air inlet into the device, more preferably at least 200 ml/s most preferably at least 300 ml/s. A suitable member for driving the fan is a small motor (38), for example a DC motor available from MABUCHI Motor Co., LTD., Japan, under the designation of RF-330TK.

The motor is controlled by a circuit board (40). In this example, power for the motor is supplied by means of a battery (42), preferably a 1.5 V dry alkaline cell battery, or a rechargeable battery, which is connected to the circuit board by two battery contacts (44). The battery (42) is held into the device by a battery door (46) onto which is adhered a small piece of foam (48) which helps to maintain a tight fit of the battery into the device. The circuit board also contains circuitry controlling an LED (50) which blinks to indicate a low battery condition.

In this example of the device (30) of the present invention, the battery (42), fan (36), motor (38), and circuitry are designed to require very low power draw, enabling the device (30) to run continuously for a long period of time. Preferably the device (30) of this example continuously draws less than 20 mA, more preferably less than 10 mA, and most preferably less than 8 mA. To require infrequent battery replacement, the replaceable power supply of this example preferably is designed to last at least one month, more preferably at least two months, yet more preferably at least three months, most preferably at least 4 months.

To facilitate ease of use to the user of the device, an indicator is preferred to announce the approaching need to replace the battery. An indicator could be audible, such as a buzzer or whistle; or visual such as a blinking light or raised flag for example. In this example, the indicator is a blinking light emitting diode (LED) (50) which blinks a few dozen times per minute when the voltage of the replaceable power unit fails below about 0.9 V. The LED (50) of this example operates at 3.0 V, much higher than the voltage supplied by the replaceable battery. To enable the operation of this LED (50), a permanent 3.0 V lithium cell is mounted to the circuit board (40) to power this circuit. The lithium cell is expected to last the lifetime of the device, approximately 5 years.

FIG. 4A is a front elevational view of an alternate example of a device (60) of the present invention. In FIG. 4A, a device (60) is presented which comprises air outlets (64) on each side of a base (65) and a removable and replaceable filter member (70). The filter member (70) is placed onto the base (65) such that air flow from a fan draws air through air inlets (62) in the top of the filter member (70), as shown in FIG. 4B, and through the air outlets (64) on the base (65), as shown in FIG. 4A.

In this example, the filter member (70) contains a filter medium and a battery. The filter medium is designed to exhibit the same useful lifetime as that of battery so that both may be replaced as a single unit. The filter member (70) contains two metal contacts (not shown) allowing an electrical current to flow from the battery to the base. The filter medium of the device utilizes the same activated carbon and potassium permanganate system as described in the example of FIG. 1. The filter medium is shaped such that a 1.5 volt dry alkaline "D" battery fits inside a void in the filter.

Similar to the preferred mode of the device of the present invention, the base (65) contains a fan, motor and a circuit board which controls the motor and an LED (not shown) which blinks to indicate the upcoming need to replace the filter member (70) containing the battery and filter medium. Further, the base (65) also contains metal contacts allowing electrical current to flow from the battery (contained in the filter member) to the motors.

FIG. 5A is a front elevational view of another alternative device (80) of the present invention while FIG. 5B is a side elevational view of the device of FIG. 5A. As shown in FIGS. 5A and 5B, the device (80) comprises an air inlet (82) on each side of a base (85), multiple air outlets (84), and a removable and replaceable filter member (90). The filter member (90) is placed onto the base (85) such that air flow from a fan draws air through the air inlets (82) in the base (85), through the filter medium, and out through the air outlets (84) in the filter member (90).

In this example, the filter member (90) contains a filter medium and a battery. The filter medium is designed to exhibit the same useful lifetime as that of battery so that both may be replaced as a single unit. The filter member (90) contains two metal contacts (not shown) allowing an electrical current to flow from the battery to the base (85). The filter medium of the device (80) utilizes the same activated carbon and potassium permanganate system as described in the example of FIG. 1. The filter medium is shaped such that air is forced from the base (85) into the bottom and middle of the filter and then must travel outward through the filter medium to flow through the air outlets (84). Further, this filter is shaped such that a 1.5 volt dry alkaline "D" battery fits inside a void in the filter.

In this example, the base (85) may contain multiple fans and motors to provide more air flow through the filter assembly. Because of the filter housing geometry, the best performance with this device is obtained by using two centrifugal fans, powered by one or two motors. The base (85) contains a circuit board which controls the motors and an LED (not shown) which blinks to indicate he need to replace the filter member (90) containing the battery and filter medium. Further, the base (85) also contains metal contacts allowing current to flow from the battery (contained in the filter assembly) to the motors. Optionally, the base (85) may be designed to contain the replaceable battery, eliminating the battery from the filter unit.

What is claimed is:

1. An air filtering device comprising:
a first filtering member;
a second filtering member comprising an oxidizing agent; and
an air flow conduit defining an air flow path through the device from an air inlet to an air outlet, said first filtering member and said second filtering member being positioned to interact with at least a portion of molecules from the air flow path, wherein said first filtering member is adapted to remove malodor molecules from the air flow path when air contacts said first filtering member, wherein said second filtering member is adapted to oxidize ethylene from the air flow path, and wherein less than 30% of a macroscopic surface of said oxidizing agent is immediately exposed to air.

2. The air filtering device according to claim 1 wherein said air filtering device further comprises an air moving member for moving air along the air flow path.

3. The air filtering device according to claim 2 wherein said air moving member is adapted to displace at least 100 ml of air per second through said air inlet into said device.

4. The air filtering device according to claim 1 wherein said first filtering member comprises activated carbon.

5. The air filtering device according to claim 4 wherein said activated carbon is supported on a support member, said support member comprising a foam, a woven, or a non-woven web material.

6. The air filtering device according to claim 5 wherein said activated carbon is supported on a polyurethane foam and has a carbon density of between 0.01 and 0.32 grams per $cm^3$.

7. The air filtering device according to claim 4 wherein said first filter member comprises from 5 to 30 grams of activated carbon.

8. The air filtering device according to claim 1 wherein said oxidizing agent is supported on a structure comprising at least one zeolite and alumina.

9. The air filtering device according to claim 8 wherein said oxidizing agent is included as part of a solid particle structure that is supported by a support comprising at least one of a foam structure, layered non-woven materials, and layered woven materials.

10. The air filtering device according to claim 4, 8 wherein at least 30% of the macroscopic surface of the oxidizing agent is in contact with the activated carbon.

11. The air filtering device according to claim 1, 8 wherein said oxidizing agent is configured relative to said air flow path such that air flowing along said air flow path does not flow through the oxidizing agent.

12. The air filtering device of claim 1, wherein said oxidizing agent comprises potassium permanganate.

13. The air filtering device of claim 1, wherein said first filtering member and said second filtering member are contained in a piece of woven nylon.

14. An air filtering device comprising:
a first filtering member comprising activated carbon supported on a support member having a carbon density of between 0.01 and 0.32 grams per $cm^3$, wherein said support member comprises foam, a woven web material or a nonwoven web material;
a second filtering member; and
an air flow conduit defining an air flow path through the device from an air inlet to an air outlet, said first filtering member and said second filtering member being positioned to interact with at least a portion of the molecules from the air flow path; wherein said first filtering member is adapted to remove malodor molecules from the air flow path when air contacts said first filtering member and wherein said second filtering member is adapted to oxidize ethylene; and wherein said second filtering member is configured relative to said air flow path such that the second filtering member is not exposed to direct air flow along said air flow path.

15. The air filtering device of claim 14, wherein the support member comprises a polyurethane foam.

16. An air filtering device comprising:
a first filtering member;
a second filtering member comprising an oxidizing agent supported on a structure comprising at least one of zeolite and alumina; wherein said oxidizing agent is included as part of a solid particle structure supported by a support comprising at least one of a foam structure, layered non-woven materials, and layered woven materials; and
an air flow conduit defining an air flow path through the device from an air inlet to an air outlet, said first filtering member and said second filtering member being positioned to interact with at least a portion of the molecules from the air flow path; wherein said first filtering member is adapted to remove malodor molecules from the air flow path when air contacts said first filtering member and wherein said second filtering member is adapted to oxidize ethylene; and wherein said second filtering member is configured relative to said air flow path such that the second filtering member is not exposed to direct air flow along said air flow path.

17. The air filtering device of claim 16, wherein the oxidizing agent comprises potassium permanganate.

18. An air filtering device comprising:
a first filtering member;
a second filtering member comprising an oxidizing agent; and
an air flow conduit defining an air flow path through the device from an air inlet to an air outlet, said first filtering member and said second filtering member being positioned to interact with at least a portion of the molecules from the air flow path wherein said first filtering member is adapted to remove malodor molecules from the air flow path when air contacts said first filtering member and wherein said second filtering member is adapted to oxidize ethylene from the air flow path; wherein said oxidizing agent is configured relative to said air flow path such that air flowing along said air flow path does not flow through the oxidizing agent.

19. The air filtering device of claim 18, wherein the oxidizing agent comprises potassium permanganate.

20. The air filtering device of claim 14, wherein the second filtering member is arranged to surround a portion of the first filtering member.

21. The air filtering device of claim 16, wherein the second filtering member is arranged to surround a portion of the first filtering member.

* * * * *